United States Patent [19]
Hiramatsu et al.

[11] Patent Number: 5,527,094
[45] Date of Patent: Jun. 18, 1996

[54] RESTRAINT AND PROTECTION SEAT FOR INFANT

[75] Inventors: Koji Hiramatsu; Kazuo Zeze, both of Shiga, Japan

[73] Assignee: Takata Corporation, Tokyo, Japan

[21] Appl. No.: 188,328

[22] Filed: Jan. 24, 1994

[30] Foreign Application Priority Data

Jan. 28, 1993 [JP] Japan .................... 5-032826

[51] Int. Cl.$^6$ ........................................ A47C 1/08
[52] U.S. Cl. .................... 297/250.1; 297/463.1
[58] Field of Search ............... 297/250.1, 254–256, 297/256.1, 256.11, 256.13, 256.15, 216.1, 216.11, 254.12, 464, 468, 471, 472, 476, 479, 480, 463.1

[56] References Cited

U.S. PATENT DOCUMENTS

| | | | |
|---|---|---|---|
| 3,695,697 | 10/1972 | Stoffel | 297/479 |
| 3,968,994 | 7/1976 | Chika | 297/464 X |
| 4,660,889 | 4/1987 | Anthony et al. | |
| 4,854,639 | 8/1989 | Burleigh et al. | 297/250.1 |
| 5,115,523 | 5/1992 | Cone | 297/464 X |
| 5,236,221 | 8/1993 | Minami | 297/256.13 |

FOREIGN PATENT DOCUMENTS

| | | |
|---|---|---|
| 0504618A1 | 9/1992 | European Pat. Off. . |
| 8715700.4 | 3/1988 | Germany . |

*Primary Examiner*—Milton Nelson, Jr.
*Attorney, Agent, or Firm*—Kanesaka & Takeuchi

[57] ABSTRACT

A restraint and protection seat for an infant is placed on a seat of a vehicle and restrained by a seat belt equipped in the vehicle. The restraint and protection seat is formed of a seat section, an infant restraint device attached to the seat section for holding a body of an infant when the infant is seated in the seat section, and a belt engaging device attached to a back surface of a seat back portion of the seat section. The belt engaging device includes an elongated base portion having a first pointed waveform surface, and a hook portion having a second pointed waveform surface corresponding to the first pointed waveform surface. The hook portion is spaced from the base portion to form a space therebetween smaller than the thickness of a seat belt in the vehicle. Thus, when the seat belt is inserted into the space between the base portion and the hook portion, the seat section is securely fixed to the seat belt.

4 Claims, 8 Drawing Sheets

RESTRAINT AND PROTECTION SEAT FOR INFANT

BACKGROUND OF THE INVENTION

This invention relates to a restraint and protection seat for an infant, in particular, to a restraint and protection seat for an infant, which is disposed on a vehicle seat of an automobile, an airplane, or the like. This kind of seat is securely fixed on the vehicle seat by a webbing of a seat belt device for an occupant restraint and protection device.

An infant sitting in the restraint and protection seat is restrained and protected by an infant restraint and protection system such as an infant seat belt device integrated with the restraint and protection seat.

For instance, a seat belt device is furnished in an automobile, an airplane, or the like to hold an occupant during driving or in flight. A seat belt device can protect the occupant against an impact at sudden acceleration or deceleration. But such a seat belt device does not effectively protect a child, in particular, an infant. Because the belt length and the like are formed depending on a body size of an adult.

Therefore, many kinds of restraint and protection seats have been proposed and used in the past. The restraint and protection seat for an infant in general use comprises a seat main body having a seat surface disposed on a seat frame made of resin having high rigidity wherein the seat surface is disposed on a base mounted on a vehicle seat, and an infant seat belt device for restraining the infant sitting on the seat main body from moving. The restraint and protection seat is fixed and supported on the vehicle seat by a webbing of the seat belt device furnished to the vehicle seat.

FIG. 1 is a schematic perspective rear view Showing a conventional restraint and protection seat for an infant 50. FIG. 1 shows a condition that the restraint and protection seat for an infant 50 is fixed and supported on a vehicle seat (not shown) by a webbing W of the seat belt device 51.

The description will now be briefly made as regards the structure of the seat belt device 51 for an occupant restraint and protection (the seat belt device of this type is known by the name of three-point style seat belt device) shown in FIG. 1.

The seat belt device 51 has usually one webbing W and forms a shoulder belt 54 and a lap belt 55 when withdrawn. An end of the webbing W is fixed to a vehicle floor or the like by an anchor 56 and the other end of the webbing W is wound and accommodated in an emergency locking retractor 57 (it will be called ELR hereinafter). The ELR 57 winds the webbing W by spring force of a coil spring integrated in the ELR 57 to retract the webbing W into the ELR 57. The ELR 57 locks the webbing W not to be drawn out only when an impact is applied.

The ELR 57 prevents the webbing W from being drawn out by the locking mechanism at an impact to restrain the movement of the occupant. Under normal conditions, a winding drum within the ELR 57 is held by a return spring having weak winding force so that the webbing W is allowed to be drawn out from the ELR 57 without restraint.

The description will now be briefly made as regards means for fixing and holding the restraint and protection seat for an infant 50 on the vehicle seat by means of this three points style seat belt device.

A base main body 63 has a base unit 60 mounted on the vehicle seat (not shown) as shown in FIG. 1. The base unit 60 is provided with the seat frame 61 having an L shape and disposed recliningly by a slide rail (not shown). The seat frame 61 is covered by a seat cushion 62.

As shown in FIG. 1, the seat frame 61 has side walls 61a and 61a on the right and left sides of the seat frame 61 to define the movement of the infant, a seat portion and seat back 61b disposed between the side walls 61a and 61a. Each of the side walls 61a and 61a has a belt guide hole 64 in a substantially rectangular shape, respectively, to insert the webbing W into the belt guide hole 64. The shoulder belt 54 and the lap belt 55 are inserted into the belt guide holes 64 and 64 and the tongue portion 53 is connected to a buckle unit 58 positioned near the vehicle floor, so that the restraint and protection seat for an infant is fixed to the vehicle seat.

Since the ELR 57 is not in the locking state under a normal driving condition, the webbing W is easily drawn out and shifted even if the tongue 53 is connected to the buckle unit 58, so that there is a possibility that the restraint and protection seat for an infant slips out of the vehicle seat.

Usually, in such a restraint and protection seat for an infant, the webbing W is turned back at the position of the tongue 53, and a locking clip 70 is attached to the webbing W near the tongue 53 to connect an end of the shoulder belt 54 and an end of the lap belt 55 of the webbing W together. Friction is generated between the shoulder belt 54 and the lap belt 53 by attaching the locking clip 70 to prevent the lap belt 55 from loosening. Therefore, the restraint and protection seat for an infant 50 is securely fixed to the vehicle seat in place by the lap belt 55.

For preventing the locking clip from being lost, instead of using locking clip 70, the seat frame 61 may be provided with a slit above the belt guide hole 64, which allows the webbing W to be inserted and has a clip mechanism.

The restraint and protection seat for an infant as mentioned above has a seat frame which is generally structured as an integral construction, so that the restraint and protection seat is structured in relatively large size. Therefore, it is difficult to attach and remove the restraint and protection seat for an infant or in carrying.

For solving the above mentioned conventional problems, the inventor of the present invention has already filed an application (Japanese Patent Application No. 322094/1991) disclosing a restraint and protection seat for an infant which is provided with a hinge between a seat back and a seat portion to be folded up as the seat back covers the seat portion. According to this application, the restraint and protection seat for an infant can be easily carried. Furthermore, by using a seat back rotation controlling unit having a locking mechanism, the seat back is set and maintained at a predetermined angle during normal usage, and maintained in a folding condition while the restraint and protection seat is folded.

The restraint and protection seat for an infant of this kind is also fixed and held to the vehicle seat by using the seat belt device.

However, the restraint and protection seat for an infant having a rotatable seat back does not have the seat frame 61 such that the seat portion and seat back is integrated. Therefore, there is no possibility that this type of restraint and protection seat provides a belt guide corresponding to the large belt guide hole 64 formed in the side portion 61a of the seat frame 61. The webbing is hooked around the seat unit and base unit which construct the seat portion. The locking clip or the like is then attached at the lower portion of the whole to prevent the webbing from loosening so that the restraint and protection seat is fixed. Therefore, it is difficult to attach the restraint and protection seat for an infant to the vehicle seat.

SUMMARY OF THE INVENTION

Accordingly, an object of the present invention is to overcome the above mentioned conventional problems and to provide a restraint and protection seat for an infant that can be easily and securely fixed and held by a webbing.

For solving the above mentioned problems, this invention provides a restraint and protection seat for an infant to be fixed by hooking around a seat belt device which restrains an occupant in a condition that the restraint and protection seat for an infant is mounted on a vehicle seat. The restraint and protection seat comprises a seat portion on which the infant sits; a seat back portion rotatably connected to said seat portion and for holding the infant from the back of the infant; an infant restraint means for restraining the infant from moving; and a belt engaging means disposed on one surface of said seat back portion, wherein said one surface is opposed to the surface facing the back of the infant, a webbing of said seat belt device for restraining the occupant being engaged to said belt engaging means so that the webbing is restrained from being drawn out to maintain the restraint and protection seat for an infant in a fixing condition on said vehicle seat.

In the present invention, it is preferable that said belt engaging means has a slit portion, said webbing being inserted into said slit portion to be engaged and fixed to restrain said webbing from being drawn out. In this case, it is preferable that said slit portion has a lightning shape having successive curvatures.

Furthermore, it is preferable that said belt engaging means has an elastic pressing portion, and said webbing is pressed and held by said elastic pressing portion to restrain said webbing from being drawn out.

According to the present invention, the belt engaging means is disposed on one surface of the seat back portion wherein the one surface is opposed to the surface facing the back of the infant. The webbing of the seat belt device for the occupant is then engaged and fixed to the belt engaging means to restrain the webbing from being draw out from a retractor such as ELR to maintain the restraint and protection seat for an infant on the vehicle seat in the fixing condition so that the restraint and protection seat for an infant is securely fixed to the vehicle seat. Furthermore, the engaging mean is disposed at a position to easily engage the webbing so that the webbing is easily hooked around.

The slit portion is disposed on the belt engaging means. The webbing is engaged and fixed by inserting the webbing to the slit portion to cause friction, therebetween. The webbing is securely restrained from being drawn out by this friction. In this case, the slit portion has a lightning shape having successive curvatures so that the webbing is securely engaged.

The belt engaging means has an elastic pressing portion. The webbing is pressed and held by the elastic pressing portion to restrain said webbing from being drawn out. The restraint and protection seat for an infant is more securely fixed to the vehicle seat.

DESCRIPTION OF THE PREFERRED EMBODIMENTS

An embodiment of a restraint and protection seat for an infant according to an embodiment of the present invention is now described referring to FIGS. 4–9.

Figure 1:
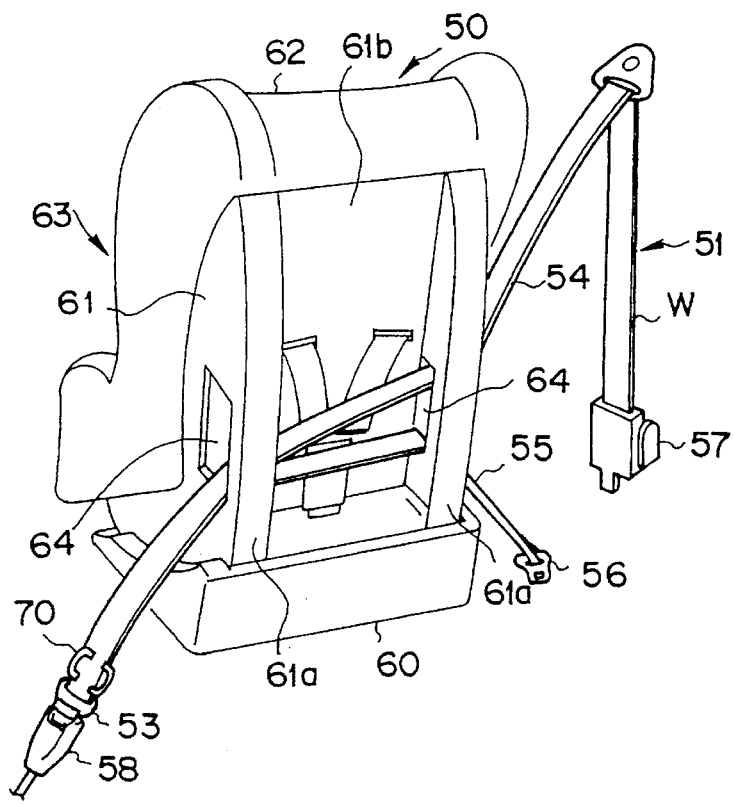
FIG. 1 is a perspective rear view showing a condition that a conventional restraint and protection seat for an infant is fixed by a webbing.
Figure 2:
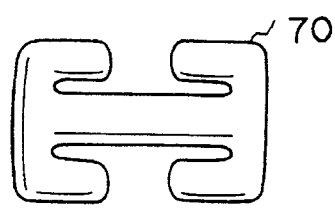
FIG. 2 is a front view showing an example of a locking clip used in the restraint and protection seat for an infant shown in FIG. 1.
Figure 3:
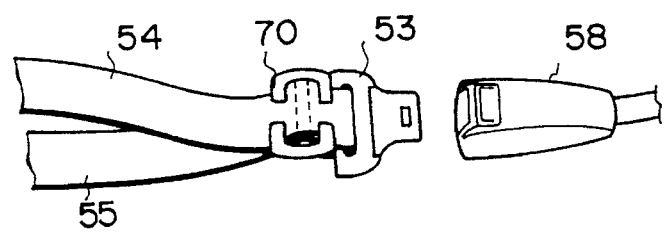
FIG. 3 is an explanatory view showing a condition that the locking clip shown in FIG. 2 is attached.
Figure 4:
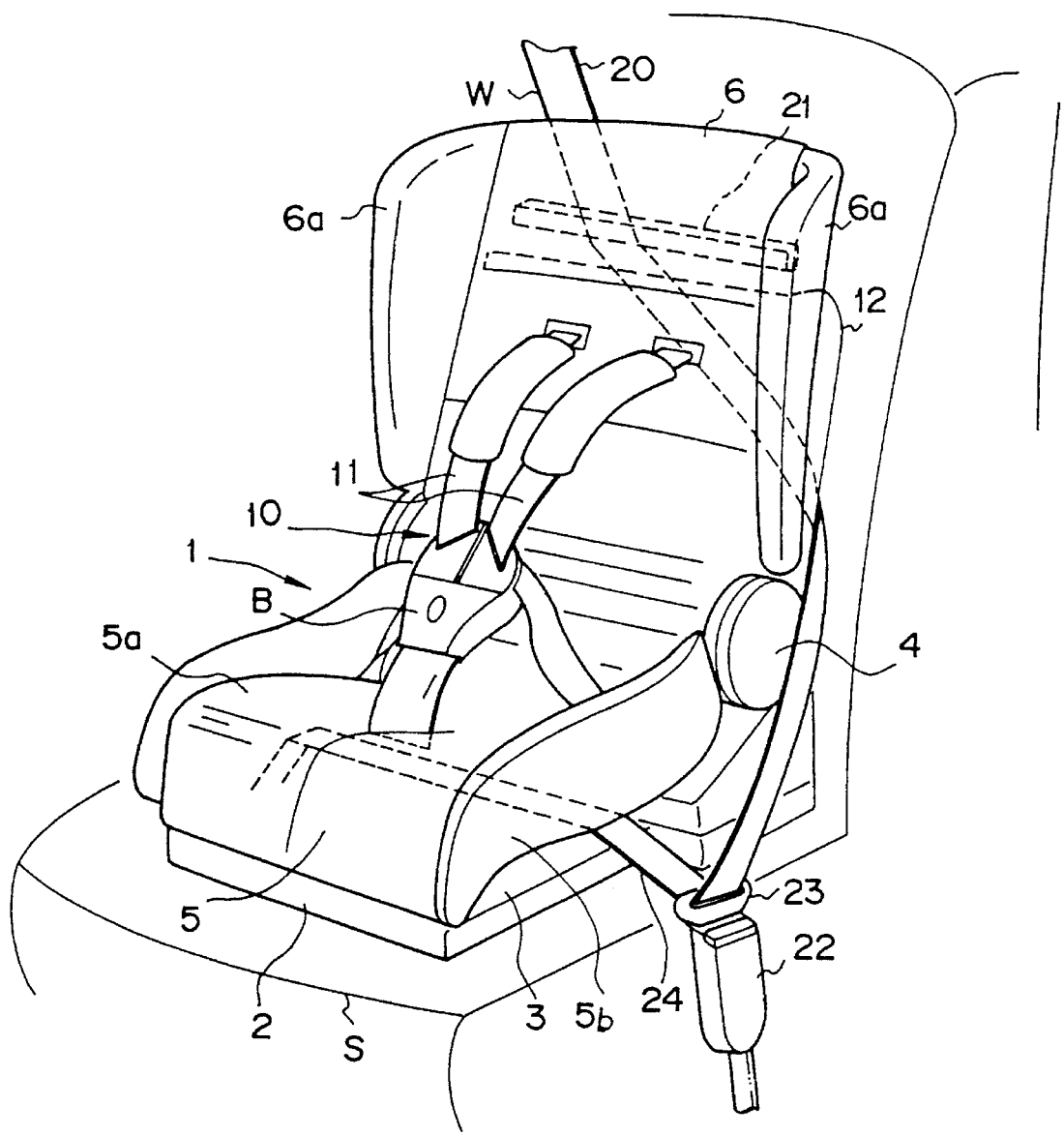
FIG. 4 is a perspective view showing an embodiment of a restraint and protection seat for an infant according to an embodiment of the present invention.

FIG. 4 is a schematic perspective view showing a condition that a restraint and protection seat for an infant is fixed to a vehicle seat by a webbing.

The description will now be briefly made as regards a structure of the restraint and protection seat for an infant.

Referring to FIG. 4, numeral 2 designates a base portion. The base portion 2 has a substantial flat plate shape to securely mount the restraint and protection seat for an infant 1 on a vehicle seat of an automobile or the like. The base portion 2 has a seat portion 3 disposed on an upper surface of the base portion, on which the infant sits. The seat portion 3 has a rotatable supporting portion 4 disposed at the rear portion of the seat portion 3. A seat main body 5 is disposed rotatably against a rotatable shaft (not shown) supported by the rotatable supporting portion 4. The seat main body 5 has a seat surface 5a having a gently curved surface. The seat surface 5a is disposed on an upper surface of the seat portion 3 so that the whole seat is supported by the seat portion 3 when the infant sits.

A seat back portion 6 is rotatably disposed by the rotatable supporting portion 4. The seat back portion 6 is capable of setting a rotatable angle at a predetermined value by a seat back rotation controlling unit (not shown) integrated in the rotatable supporting portion 4.

The seat back portion 6 has side portions 6a and 6a disposed on both sides of the seat back portion 6. The side portions 6a and 6a are formed to be able to cover the seat side portions 5b and 5b when the seat back portion is folded up.

Numeral 10 designates an infant seat belt device. In this embodiment, a five-point style seat belt device is used as an infant seat belt device. The five-point style seat belt device has a large buckle device B. The buckle device B dispenses an impact inflicted to the infant. The seat back portion 6 has a shoulder belt adjuster fitted in the back surface of the seat back portion 6 for adjusting the height of the shoulder belt 11. Thus, the height of the shoulder belt 11 is capable of being adjusted depending on the body size of the infant sitting in the restraint and protection seat.

The shoulder belt adjuster (not shown) is accommodated in a cover 12 of the seat back portion 6.

The description will now be made as regards a condition that the restraint and protection seat is fixed by the webbing W as shown in FIG. 4.

A shoulder belt 20 extends from a shoulder anchor (not shown) which is located at the upper side. The webbing W of the shoulder belt 20 is engaged to a belt hook 21 disposed on the upper back surface of the seat back portion 6. The end of webbing W is connected and fixed to the buckle device 22 at the tongue 23.

The webbing W is bent at the tongue 23 to constitute a lap belt 24. The webbing W of the lap belt 24 extends through between the seat portion 3 and the seat main body 5. The end of the lap belt 24 is secured to the anchor (not shown) positioned near the vehicle floor. The webbing W is engaged to the belt hook 21 to prevent the webbing W from loosening which extends from the belt hook 21 to the anchor portion as the other end of the webbing W through the tongue 23. Accordingly, the restraint and protection seat for an infant 1 can be fixed to the vehicle seat S by one part of the shoulder belt 20 and the lap belt 24.

The belt hook 21 is now described more in detail referring to FIGS. 5(a), 5(b)–7.

Figure 5A:
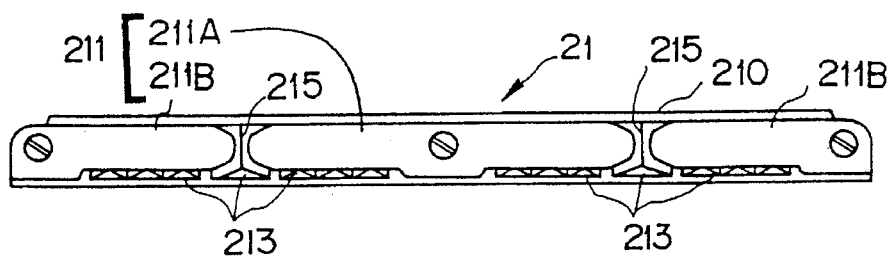
FIGS. 5(a) and 5(b) are a front view and a top plan view, respectively, illustrating a belt hook as an example of the restraint and protection seat for an infant according to the present invention.

The belt hook 21 is a resin molded product. Referring to FIG. 5(a), the belt hook 21 has a base portion 210 having an elongated flat plate shape and a hook portion 211 including hooks 211A, 211B provided with tongue portions. The base portion 210 and the hook portion 211 are integrated by a set screw 216 to form a predetermined slit 212, therebetween.

Figure 5B:
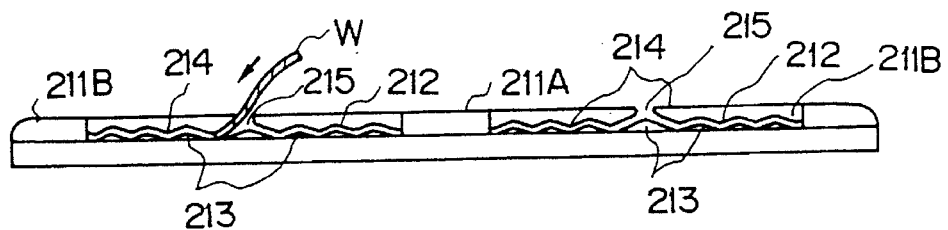

The base portion 210 has a saw tooth-waveform surface 213 on the base portion 210. The saw tooth-waveform surface 213 is slightly flattened. Crests of the saw tooth-waveform surface 213 are relatively low as shown in FIG. 5(b). The hook portion 211 also has a saw tooth-waveform surface 214 on a surface of the hook portion facing the base portion 210 according to the saw tooth-waveform surface 213. Thus, the slit 212 formed between the base portion 210 and the hook portion 211 has a lightning shape having successive gentle curvatures as shown in FIG. 5(b).

The hook portion 211 is a resin mold product and has an elasticity so that the webbing W having a thickness slightly thicker than the slit 212 is pressed by the hook portion 211 to prevent the webbing W from loosening when the webbing W is inserted into the slit.

As apparent from FIG. 5(b), the hook portion 211 has a center hook 211A positioned at the center of the hook portion 211 and having tongue portions extending on its both sides, and a side hook 211B fixed to the end of the base portion 210. A webbing insertion opening 215 is formed between the center hook 211A and the side hook 211B. The webbing W is inserted into the slit 212 through the webbing insertion opening 215 and is caught in the slit 212.

Though the slit 212 has a lightning shape having a zigzag slit in this embodiment, the slit 212 may have a wedge shape from the webbing insertion opening 215 to the inner part. The webbing W may be pushed into the inner part to be clamped. Therefore, the clamp effect is also workable by this means.

Figure 6:
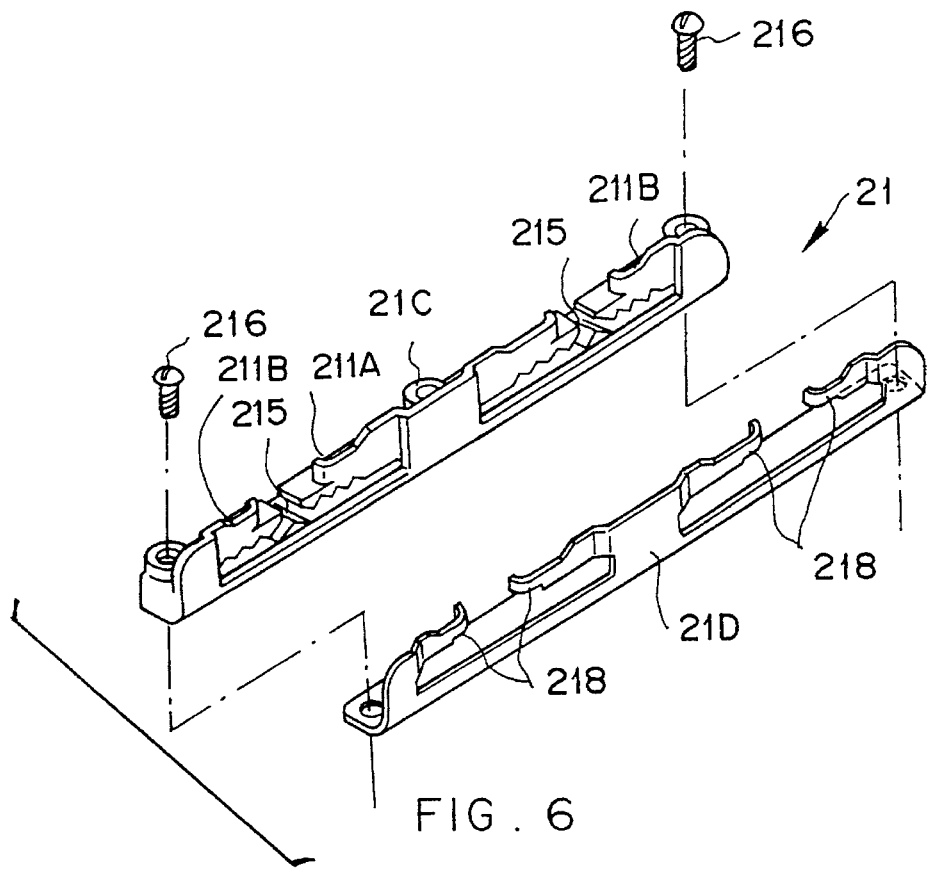
FIG. 6 is an exploded perspective view showing a variation of the belt hook shown in FIG. 5(a)

FIG. 6 shows a variation of the belt hook 21 shown in FIGS. 5(a), 5(b).

In FIG. 6, numeral 21C designates a resin hook. The resin hook is a hook with which the base portion and the hook portion are integrated. A bracket 21D made of a steel plate is integrally attached by the set screw 216 to reinforce the resin hook 21C. The bracket 21D has a claw 218. The claws 218 and 218 are put on one parts of the hook portions 211A and 211B, respectively to reinforce the hook portions 211A and 211B against the applied force when the webbing W is inserted. The set screw 216 also works for fixing the belt hook 21 to a predetermined position on the upside of the seat back portion 6.

Figure 7:
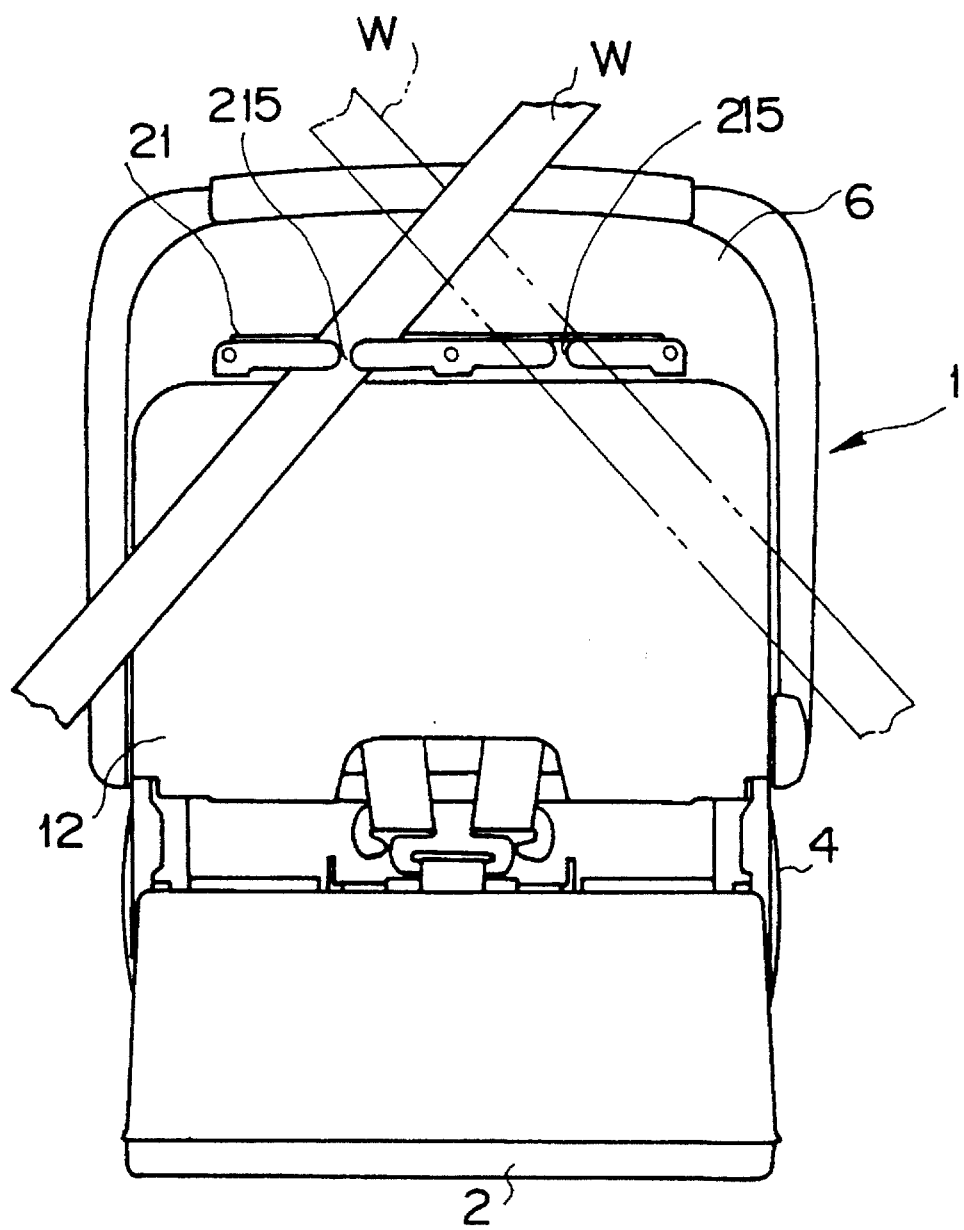
FIG. 7 is a rear view illustrating a condition of the belt hook shown in FIG. 5(a) which is attached to a seat back surface of the restraint and protection seat for an infant to engage and stop a webbing.

FIG. 7 is a rear view showing a condition of the seat back portion 6 of the restraint and protection seat for an infant 1 shown in FIG. 4 mounted on the right side seat of the automobile. The webbing W of the shoulder belt of the three-point style seat belt device extends from a shoulder anchor (not shown) at the right upper side of the figure to the left lower side. One portion of the webbing W of the shoulder belt is inserted into the webbing insertion opening 215 of the belt hook 21 of the seat back portion 6 to engage to the slit. The belt hook 21 is attached to the upper end of the seat back portion 6. The webbing W is then engaged at this position. The webbing W extending from the shoulder anchor is defined in a predetermined position. In FIG. 7, the webbing W indicated by a dashed line shows a case that the restraint and protection seat for an infant is mounted on the left side seat by the three-point style seat belt device.

The belt hook 21 shown in FIGS. 5(a), 5(b) and 6 is provided with two webbing insertion openings 215 and 215 so that the restraint and protection seat for an infant can be mounted on each vehicle seat. The webbing W is securely engaged even if the webbing W is drawn out to prevent the webbing W from loosening.

Figure 8:
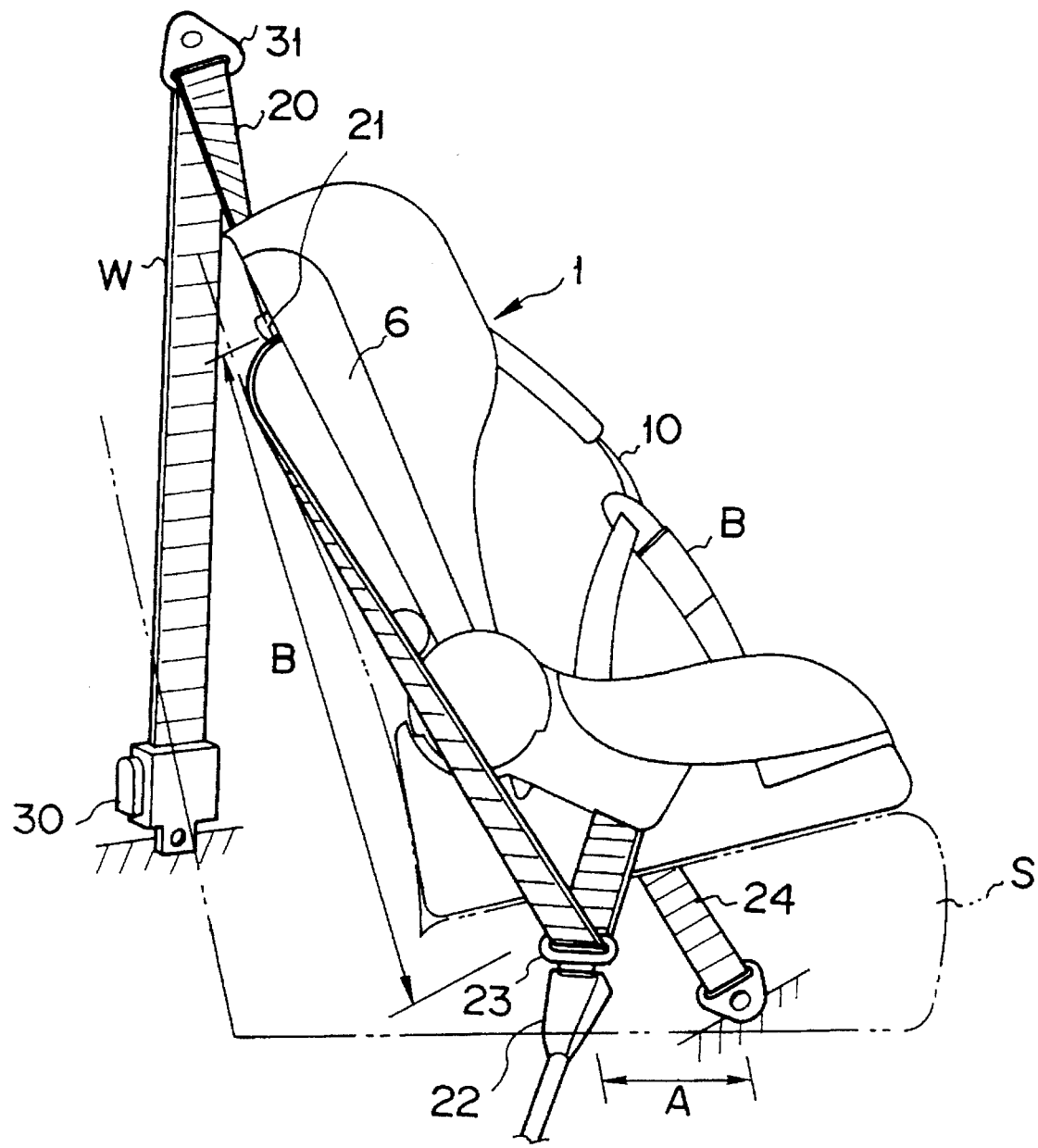
FIG. 8 is a side view showing a condition that the restraint and protection seat for an infant is fixed by the webbing by using the belt hook shown in FIG. 4 so that the restraint and protection seat for an infant faces front.
Figure 9:
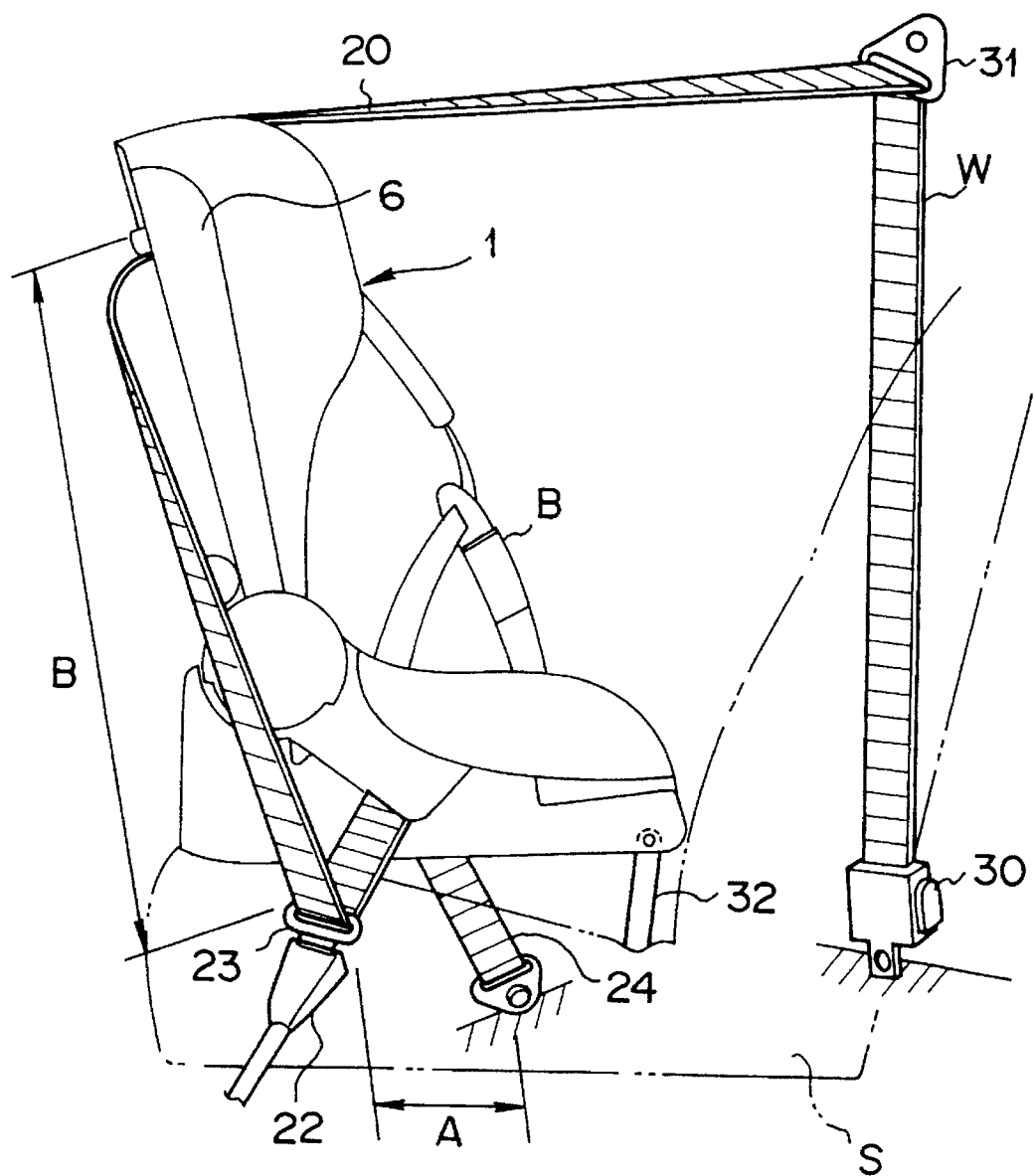
FIG. 9 is a side view showing a condition that the restraint and protection seat for an infant is fixed to face back by the webbing by using the belt hook shown in FIG. 4.

FIGS. 8 and 9 are side views by way of explanation of the portions held by webbing W when the restraint and protection seat for an infant 1 is fixed to the vehicle seat S. FIG. 8 shows a condition that the restraint and protection seat for an infant is mounted and fixed to the vehicle seat so that the restraint and protection seat for an infant faces front. The webbing W drawn out from an ELR 30 is guided to the seat back portion 6 of the restraint and protection seat for an infant 1 through the shoulder anchor 31 and engaged to belt hook 22 to prevent the webbing W from loosening in the ranges A and B. Therefore, the restraint and protection seat for an infant 1 is securely fixed to the vehicle seat of the automobile at the portion indicated by the range A to prevent the restraint and protection seat for an infant 1 from moving forward.

FIG. 9 shows a condition that the restraint and protection seat for an infant 1 is mounted and fixed to the vehicle seat so that the restraint and protection seat for an infant faces back. In this case, the webbing W has a longer length as compared with the webbing W in FIG. 5 to be hooked around from the shoulder anchor 31 to the seat back portion 6 of the restraint and protection seat for an infant 1. There is no possibility of the webbing W slipping out. We can expect that the position of the restraint and protection seat for an infant 1 is entirely defined.

The description will now be made as regards variations of the belt hook referring to FIGS. 10–13(b).

Figure 10:
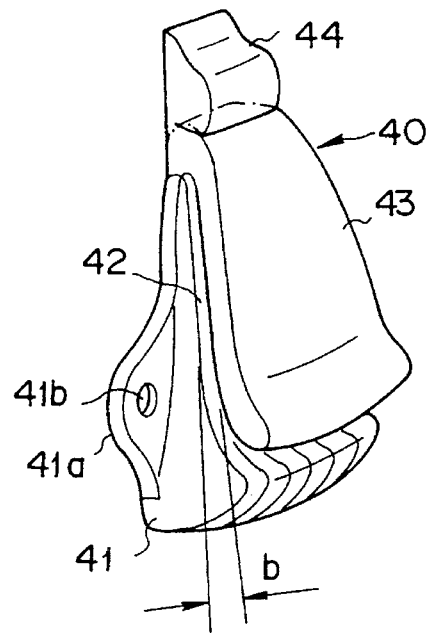
FIG. 10 is a schematic perspective view showing a variation of the belt hook shown in FIG. 5(a)
Figure 11:
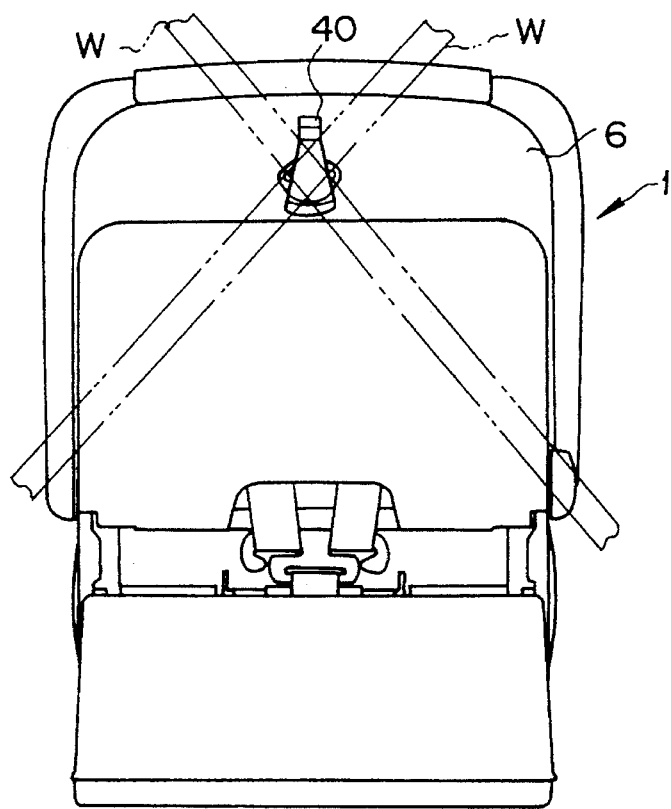
FIG. 11 is a rear view showing a condition that the belt hook shown in FIG. 10 attached to the seat back surface of the restraint and protection seat for an infant to engage and stop the webbing.

In FIG. 10, a belt hook 40 has a base portion 41 having an attachment tab 41a disposed on each of the both sides of the base portion 41 and having a flattened bastard pyramid and wedge shape, and a tongue unit 43 disposed to form a slit 42 between the tongue unit 43 and the base portion 41. The base portion 41 is made thicker toward the lower part. The tongue unit 43 extends obliquely downwardly to make a thickness or space "b" of slit 42 wider corresponding to a change of the thickness of the base portion 41. Therefore, the thickness "b" of the slit 42 has also a wedge shape.

The tongue unit 43 is a resin molded product and has an elasticity. When the webbing W is inserted into the slit, the webbing W is engaged and pressed in the slit 42. Because the webbing W has a thickness slightly thicker than the height of the slit 42. The webbing W is prevented from being disengaged.

The upper end of the tongue unit 43 is engaged to the positioning protrusion 44 disposed on the seat back portion 6 to position the belt hook 40. The base portion 41 is fixed to the seat back portion 6 by set screws through mounting holes 41b formed in the attachment tabs 41a and 41a. The belt hook 40 is formed such that the webbing W may extend from the right side or from left side, and can be engaged at the same place by disposing the belt hook 40 substantially on the middle upper end of the seat back portion 6.

Though the slit 42 has a wedge shape, the slit 42 may have a flattened lightning shape as mentioned above.

Though the belt hook 40 is comprised of two pieces of the molded products in this variation, the belt hook 40 may be an integrated molded product having the same composition and the slit 42.

The belt hook shown in FIGS. 12(a)–12(c) and FIGS. 13(a), 13(b) is fixed at the middle upper end of the seat back portion 6 as same as the belt hook 40 shown in FIG. 7 to be able to engage the webbing W from right or left side.

Figure 12A:
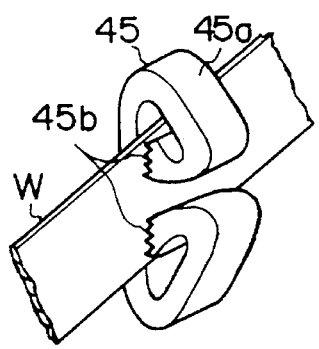
FIGS. 12(a)–12(c) are perspective views showing variations of the belt hook; and, FIGS. 13(a) and 13(b) are perspective views showing variations of the belt hook.
Figure 12B:
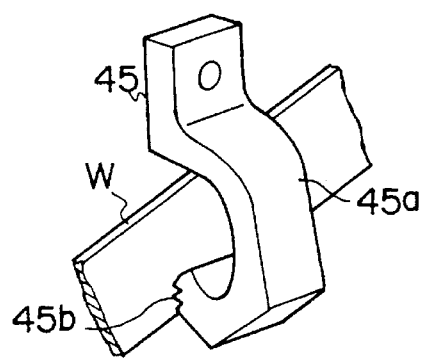
Figure 12C:
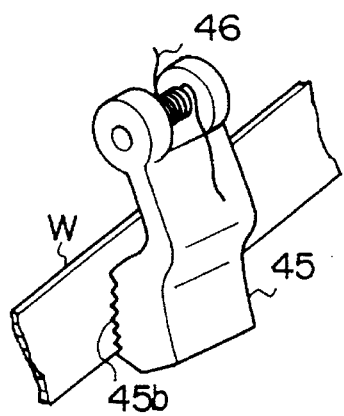

Each of FIGS. 12(a)–12(c) shows a belt hook 45 which is a resin molded product. FIGS. 12(a), 12(b) show examples that the webbing W is engaged by a blade with spring effect at an arm portion 45a to be pressed by a pressing portion 45b having a tooth form to cause friction.

FIG. 12(c) shows an example that the pressing portion 45b is urged by a torsion spring 46 attached to a rotatable axis (not shown) to hold the webbing W to cause friction. The rotatable axis is supported by a bearing disposed on the seat back portion 6.

Figure 13A:
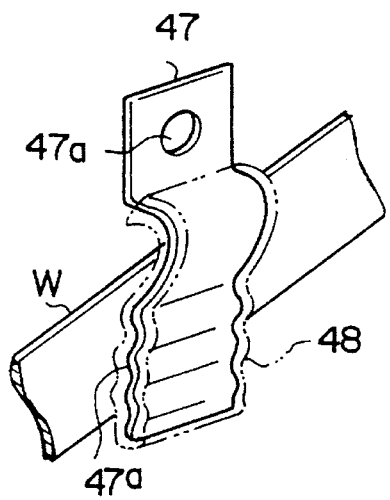
Figure 13B:
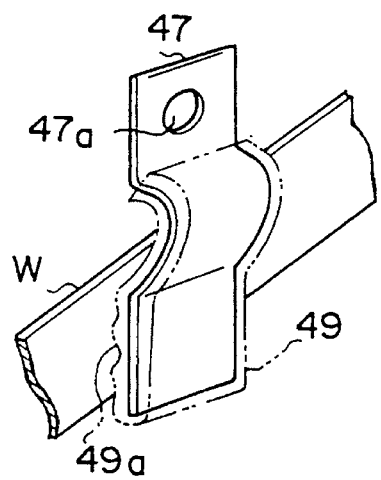

FIGS. 13(a), 13(b) show variations that metallic plates such as stainless steel having resiliency are used as the plate springs 47. In each case, the belt hook is fixed to the middle upper end of the seat back portion 6 by a set screw through a mounting hole 47a. In FIG. 13(a), the pressing portion 47a of the plate spring 47 is formed in a wave form. The resin coating 48 is applied to whole of the plate spring 47 or only to the wave formed portion of the plate spring 47.

FIG. 13(b) shows that a tooth formed pressing surface 49a is formed by a resin mold 49 instead of the wave form of the webbing pressing portion of the plate spring 47. It is an advantage that the belt hook by this construction is cheaper than any other belt hooks.

As apparent from the above description, according to the present invention, the restraint and protection seat for an infant having a rotatable back portion can be prevented from inclination caused by loosening the webbing and the webbing can be engaged at the high position of the back surface of the seat back portion, so that the restraint and protection seat for an infant can be easily and entirely fixed by the webbing.

The webbing hooked around can be defined in the predetermined position to have no free length of the webbing.

We claim:

1. A restraint and protection seat for an infant adapted to be placed on a seat of a vehicle and restrained by a seat belt equipped in the vehicle, comprising:

a seat section having a seat portion, and a seat back portion with a back surface attached to the seat portion, infant restraint means attached to the seat section for holding a body of an infant when the infant is seated in the seat section, and belt engaging means attached to the back surface of the seat back portion, said belt engaging means including an elongated base portion having a first pointed waveform surface, and a hook portion having a second pointed waveform surface corresponding to the first pointed waveform surface, said hook portion being spaced from the base portion to form a space therebetween for holding a seat belt in the vehicle, said hook portion being formed of a center portion and two side portions situated on both sides of the center portion to form openings relative to the center portion for inserting the seat belt into the space through the opening so that when the seat belt is inserted into the space between the base portion and the hook portion, the seat section is securely fixed to the seat belt.

2. A restraint and protection seat for an infant according to claim 1, wherein said base portion and said hook portion are separately formed, and connected together by fixing means.

3. A restraint and protection seat for an infant according to claim 1, wherein said base portion and said hook portion are integrally formed together.

4. A restraint and protection seat for an infant according to claim 3, wherein said belt engaging means further includes a bracket fixed to the seat back portion together with the belt engaging means, said bracket having claws to be located behind the hook portion for reinforcement.

* * * * *